United States Patent [19]

Sampath et al.

[11] Patent Number: 5,225,460
[45] Date of Patent: Jul. 6, 1993

[54] CROSSLINKABLE SURFACE COATINGS AND METHODS FOR PRODUCING SAME

[75] Inventors: Pasupathikoil R. Sampath; Daniel J. Grosse, both of Caledonia, Wis.

[73] Assignee: S. C. Johnson & Son, Inc., Racine, Wis.

[21] Appl. No.: 502,218

[22] Filed: Mar. 29, 1990

[51] Int. Cl.$^5$ .................. C08K 3/20; C08L 33/02; C08F 8/00
[52] U.S. Cl. .................. 523/409; 523/411; 525/119
[58] Field of Search .................. 525/119; 523/409, 411

[56] References Cited

U.S. PATENT DOCUMENTS

| | | | |
|---|---|---|---|
| 3,066,112 | 11/1962 | Bowen | 528/271 |
| 3,179,623 | 4/1965 | Bowen | 528/205 |
| 3,240,736 | 3/1966 | Beckwith | 524/2 |
| 3,256,226 | 6/1966 | Fekete et al. | 525/7 |
| 3,301,743 | 1/1967 | Fekete et al. | 523/523 |
| 3,367,992 | 2/1968 | Bearden | 523/400 |
| 3,651,649 | 3/1972 | Najvar et al. | 525/524 |
| 3,702,302 | 11/1972 | Wilson | 252/70 |
| 3,822,229 | 7/1974 | McMaster | 523/401 |
| 4,104,230 | 8/1978 | Chang et al. | 523/411 |
| 4,315,044 | 2/1982 | Elmore et al. | 427/386 |
| 4,328,144 | 5/1982 | Woo | 525/281 |
| 4,399,242 | 8/1983 | Fowler et al. | 523/404 |
| 4,480,058 | 10/1984 | Ting et al. | 525/119 |
| 4,489,179 | 12/1984 | Tortorello | 523/404 |
| 4,522,962 | 6/1985 | Abbey et al. | 525/117 |
| 4,557,870 | 12/1985 | Rodgers et al. | 554/24 |
| 4,588,617 | 5/1986 | Oka | 523/420 |
| 4,598,108 | 7/1986 | Hoefs | 427/386 |
| 4,740,536 | 4/1988 | Chao | 523/406 |
| 4,748,167 | 5/1988 | Das et al. | 524/410 |
| 4,772,643 | 9/1988 | Ernst et al. | 528/59 |
| 4,791,152 | 12/1988 | Adeney et al. | 523/409 |

FOREIGN PATENT DOCUMENTS

| | | |
|---|---|---|
| 47-33200 | 11/1972 | Japan |
| 48-102157 | 12/1973 | Japan |
| 50-123200 | 9/1975 | Japan |
| 51-100128 | 9/1976 | Japan |
| 56-161420 | 12/1981 | Japan |
| 57-185356 | 11/1982 | Japan |
| 59-43016 | 3/1984 | Japan |
| 62-161803 | 7/1987 | Japan |

Primary Examiner—Paul R. Michl
Assistant Examiner—P. Niland

[57] ABSTRACT

A method for producing a novel evaporable dispersion is disclosed. The dispersion exhibits shelf-storage stability at room temperature for more than 1 year. Such a dispersion, upon evaporation of the evaporable components, is able to form a crosslinked surface coating on a substrate upon curing at room temperature or elevated temperature.

14 Claims, No Drawings

CROSSLINKABLE SURFACE COATINGS AND METHODS FOR PRODUCING SAME

TECHNICAL FIELD

One aspect of our present invention is generally directed to the subject of crosslinkable surface coatings. Such surface coatings, while crosslinkable, are specifically so formulated as to be curable at room temperature. Another aspect of our invention is that such surface coatings are produced from dispersions that exhibit shelf-storage stability of 1-year or more. Accordingly, still another aspect of our present invention is directed to methods for producing a stable dispersion which can be utilized to produce durable, abrasion-resistant surface coatings that cure at room temperature.

BACKGROUND ART

Commercially-available durable, abrasion-resistant surface coatings are oftentimes manufactured from formulations which typically contain a number of ingredients, including epoxy-containing components or ingredients.

Epoxy-based surface coatings are, moreover, oftentimes typically produced from so-called "two-part" systems. For example, to produce a particular surface coating at the time of desired use, an epoxy-containing composition is combined with a hardener composition therefor. Such two-part systems are disclosed, for example, in U.S. Pat. Nos. 3,066,112 and 3,179,623, both to Bowen, and U.S. Pat. No. 3,822,229 to McMaster.

More particularly, in a two-part coating system of this sort, the epoxy-containing composition can be—and oftentimes is—hardened with an amine-containing composition, as is well known in the art. Systems of this sort are disclosed, for example, in U.S. Pat. No. 4,399,242 to Fowler et al., U.S. Pat. No. 4,557,870 to Rodgers et al., U.S. Pat. No. 4,588,617 to Oka, U.S. Pat. No. 4,740,536 to Chao, U.S. Pat. No. 4,772,643 to Ernst et al., Japanese Kokai Pat. No. Sho 47-33200, Japanese Kokai Pat. No. Sho 48-102157, Japanese Kokai Pat. No. Sho 50-123200, Japanese Kokai Pat. No. Sho 51-100128, and Japanese Kokai Pat. No. Sho 59-43016.

Alternatively, two-part coating systems can include, in lieu of amine as the "hardener" ingredient, an amide (see, e.g., U.S. Pat. No. 3,240,736 to Beckwith or Japanese Kokai Pat. No. Sho 56-161420), or a specified carboxylic acid (see, e.g., U.S. Pat. No. 3,256,226 to Fekete et al.), or an "amino"-containing ingredient (see, e.g., U.S. Pat. No. 4,598,108 to Hoefs), or an "amido"-containing ingredient (see, e.g., Japanese Kokai Pat. No. Sho 62-161803).

For a variety of reasons two-part systems of the type briefly mentioned above are inconvenient and thus undesirable. For example, because mixing of the mutually-reactive components typically quickly gives rise to crosslinking, whatever is not used becomes waste. Also from the standpoint of efficiency, it would be desirable to dispense with the "mixing" step. In particular, just prior to use, it would be desirable to dispense with that step which "mixes" or "combines" the epoxy-containing component with the hardener-containing component.

In U.S. Pat. No. 3,702,302 to Wilson, for example, there is disclosed a composition which consists of two, separate water-in-oil emulsion gels, wherein the two emulsion gels separately contain a respective one of two mutually-reactive chemical species. In particular, Wilson disclosed that one such water-in-oil emulsion gel has hydrogen peroxide in its water phase and the other water-in-oil emulsion gel has potassium sulfite in its water phase. Wilson neither discloses nor suggests, however, that such separate water-in-oil emulsion gels could be used to respectively contain an epoxy-containing component as well as a hardener-containing component to cause the epoxy moiety to "cure".

On the other hand, so-called "self-curable" compositions or formulations that include mutually-reactive chemical species such as epoxy-based "functional" polymers and amino-containing "hardener" polymers are well-known in the art. There has been great difficulty, however, in keeping such compositions from "curing" or crosslinking prematurely. Indeed, in connection with successful commercialization of such compositions, there has been a genuine concern for useful compositional pot life and stability.

One solution to the above-mentioned problem of premature reaction entails capping a reactive amino moiety or group of an amine-containing polymer with a ketone or aldehyde for the purpose of forming a so-called "ketimine", prior to mixing the amine-containing polymer with an epoxy-containing polymer. See, for example, U.S. Pat. No. 4,328,144 to Woo and U.S. Pat. No. 4,489,179 to Tortorello. After such a coating formulation is applied to a substrate, atmospheric moisture is said to cause the "ketimine" moiety to decompose thereby yielding reactive amino moieties which, in turn, coreact with the epoxy-containing moieties, for the purpose of effecting a desired "cure". There are, however, at least two major drawbacks to such a type of coating formulation. First, such a formulation is limited to non-aqueous systems; and, second, ketone, a solvent, is released into the immediate vicinity upon cure. It is well-known, however, that curable coating compositions that include solvent are generally undesirable. For example, many formerly-used well-known solvents have been deemed unsafe or otherwise environmentally unacceptable.

It would therefore be desirable, in view of the above, to reduce or—even better—totally eliminate use of such solvents in the production of durable, abrasion-resistant surface coatings that cure at room temperature. It would further be desirable that formulations providing surface coatings of this sort require no mixing at time of use yet remain stable for long periods of time.

SUMMARY DISCLOSURE OF INVENTION

A novel method for producing a novel evaporable dispersion will presently be summarized. Before summarizing the novel method, however, it would be desirable at this point to make brief mention of the evaporable dispersion. The novel dispersion includes crosslinkable ingredients or components as well as evaporable components. Such a dispersion, upon evaporation of the evaporable components, is able to form a crosslinked surface coating on a substrate at room temperature. Yet the dispersion, which exhibits a quality herein referred to as "pot life", "shelf life" or "shelf-storage" stability in excess of 1-year, requires no combining-of-ingredients or "mixing" at desired time of use.

As was mentioned above, our novel method for producing the novel evaporable dispersion comprises a series of steps. One such step is to combine water, a non-ionic emulsifier, a free-radical initiator, and an effective amount of a buffering agent, for producing an evaporable, emulsifier-containing aqueous mixture having a pH range of about 3 to about 9. The non-ionic emulsifier has an "HLB" (HydrophileLipophile Balance) value of about 9 to about 19.

Another step of our novel method is to introduce into the evaporable, emulsifier-containing aqueous mixture, at predetermined reaction conditions and while maintaining the above-mentioned pH range of about 3 to about 9, an effective amount of an emulsion-polymerizable epoxy-functional groupcontaining monomer mixture, for producing an evaporable, oil-in-water emulsion which contains polymeric particles having epoxy-functional pendant groups and possessing a glass-transition temperature (Tg) of about 10 degrees Celsius to about 120 degrees Celsius. The emulsion-polymerizable epoxyfunctional group-containing monomeric mixture, in particular, comprises relative effective amounts of (1) an emulsion-polymerizable monomer having epoxy-functional pendant groups and (2) an emulsion-polymerizable ethylenically-unsaturated monomer selected from the group consisting of a mono vinylidene aromatic monomer, an alpha beta ethylenically-unsaturated carboxylic acid monomer, an alpha beta ethylenically-unsaturated carboxylic acid ester monomer and its monomeric derivatives, a vinyl ester monomer and its monomeric derivatives, and various combinations of these, for producing the oil-in-water emulsion containing the polymeric particles having the above-mentioned epoxy-functional pendant groups.

Still another step of our novel method is to introduce into the first oil-in-water emulsion an effective amount of a second oil-in-water emulsion containing a polymer having specified epoxy-reactive pendant moieties, for producing the novel evaporable dispersion mentioned above. Such epoxy-reactive pendant moieties are selected from the group consisting of amine moieties, amide moieties, carboxylic acid moieties, and combinations of these.

The relative amounts of (1) polymeric particles having epoxy-functional pendant groups and (2) polymer having epoxy-reactive pendant moieties, in the evaporable novel dispersion, are effective, upon evaporation of the volatile components of the dispersion, to enable crosslinking to take place between the epoxy-functional groups and the epoxy-reactive moieties at room temperature.

Additional advantages and features of our invention will presently be discussed in further detail hereinbelow.

INDUSTRIAL APPLICABILITY

Our present invention can be utilized to produce durable, abrasion-resistant and solvent-resistant surface coatings on substrates such as cardboard, paper, wood, concrete, stone, marble and terrazzo, and a variety of metal surfaces including polished metal surfaces and metal foils. Stone, as defined herein, is understood to include brick, cobblestone, and quarry tile. Quarry tile, as defined herein, can take a variety of shapes and compositions including red clay and baked clay.

Our surface coatings can be shipped in bulk-sized quantities, or smaller-sized containers, as desired. For example, our surface coatings can readily be shipped in 55-gallon drums, or in rail cars. If consumers desire smaller more convenient sized containers, our surface coatings can be sold in 1-gallon containers (or smaller) or in aerosol containers.

BEST MODE FOR CARRYING OUT THE INVENTION

While our present invention is susceptible to embodiment in a variety of forms, there is hereinbelow described in detail several presently preferred embodiments, with the understanding that the present disclosure is to be considered as merely an exemplification of our present invention without limitation to the specific embodiments discussed.

In the ensuing detailed description, certain terms as well as certain terminology will be utilized for purposes of conciseness, and for otherwise elucidating the features and advantages of our present invention. Such terms are defined as follows.

The terms "catalyst" and "accelerator" as used herein refer to a substance which affects the rate of a particular chemical reaction. While thus affecting the rate of such a chemical reaction, the catalyst (or accelerator) is not itself consumed nor does the catalyst (or accelerator) itself undergo a chemical change. (See, e.g., pages 205-206 of "The Condensed Chemical Dictionary", 10th ed., published 1981 by Van Nostrand Reinhold Co.)

The term "dispersion" as used herein is defined as a mixture, not necessarily initially stable, comprising an aqueous continuous phase and a nonaqueous discontinuous phase dispersed throughout the aqueous-based continuous phase.

The term "emulsion" as used herein is understood to mean a mixture, generally initially stable, of two or more mutually immiscible solids, liquids and/or gases held in suspension by relatively small amounts of specified substances which are often characterized by terms such as "detergents", "emulsifiers", "soaps", "surfactants", and so forth. There are, in general, both oil-in-water emulsions as well as water-in-oil emulsions. More particularly, all stable emulsions comprise a continuous phase and a discontinuous phase dispersed throughout the continuous phase.

The term "room temperature" as used herein is defined as a temperature of from about 20 degrees Celsius to about 25 degrees Celsius.

The terms "pot life", "shelf life", and "shelf-storage" stability as such terms are used interchangeably herein are defined, in part, in relation to the physical properties of a crosslinked surface coating produced by preparing our novel evaporable dispersion in accordance with the principles of our novel method, and substantially immediately thereafter causing the evaporable components of our novel dispersion to evaporate by subjecting the dispersion to room-temperature or elevated-temperature drying conditions, as desired. These terms, accordingly, are also defined in relation to the physical properties of that crosslinked surface coating which is produced in the manner described above from the novel evaporable dispersion after such has been stored at a preselected temperature for a specified period of time. Thus, the terms "pot life", "shelf life", and "shelf-storage" stability as used interchangeably herein are understood to mean that period of time that passes, beginning with the formulation of our novel evaporable dispersion, during which period of time the evaporable dispersion is able to form, upon evaporation of the evaporable components, a crosslinked surface coating having physical properties which do not significantly change over the specified period of time.

The term "soluble" as used herein connotes the ability of being so uniformly dissolved in a solvent as to pass into solution therein.

Having defined the above terms thusly, we should now like to more particularly disclose our invention. Before we do so, however, we should like to briefly mention that certain other terms, not yet discussed and defined, will be discussed and defined, as needed, further hereinbelow.

Accordingly, in the following detailed description, our use of the term "parts", unless indicated otherwise by the surrounding text, shall be in reference to the total weight of monomer or monomers which are polymerized to form those polymeric particles dispersed throughout the aqueous phase of our novel evaporable dispersion, such dispersion having been produced in accordance with the principles of our novel method.

As was briefly mentioned above, one aspect of our present invention is directed to a method for producing an evaporable dispersion which includes evaporable components. In particular, upon evaporation of the evaporable components, the dispersion is able to form a crosslinked surface coating at room temperature on a substrate. Accordingly, one preferred method of producing the novel evaporable dispersion of our present invention comprises the following series of steps.

First, into an agitated reactor of suitable size, a suitable volume of water is introduced, to produce a predetermined "total solids" level for the dispersion. The desired "total solids" level may range from about 5 to about 60 weight percent, based on total weight of the dispersion, and preferably ranges from about 30 to about 45 weight percent. The water is preferably deionized. After introduction of water into the reactor, about 3 to about 4 parts of a suitable non-ionic emulsifier (or "surfactant") is next introduced into the reactor, followed by 0 to about 3 parts, preferably about 0.25 parts to about 1 part, of an optional suitable anionic emulsifier. The Hydrophile-Lipophile Balance ("HLB") value of the non-ionic emulsifier is about 9 to about 19, for purposes of producing the crosslinkable epoxy-functional group-containing polymeric material described hereinbelow. Such reactor contents are then brought to the desired reaction temperature of about 80 degrees Celsius to about 95 degrees Celsius, preferably about 85 degrees Celsius to about 90 degrees Celsius.

Into a separate vessel of suitable size is added about 1 to about 5 weight percent of that amount of water which was initially charged into the reactor, followed by the addition, at room temperature, of about 0.5 parts to about 1 part of a suitable water-soluble free-radical initiator. Again, deionized water is preferred. Thereafter, about 0.3 parts to about 0.5 parts of a suitable buffering agent is added to the separate vessel. The quantity of buffering agent in such vessel, when the vessel contents are added to the reactor, is effective for maintaining the reactor contents at a pH range of about 3 to about 9, preferably at a pH range of about 6 to about 8, and more preferably at a pH range of about 6.5 to about 7.5.

Next, about 1 part to about 60 parts, preferably about 20 parts to about 40 parts, of a monomeric mixture which includes an emulsion-polymerizable monomer having epoxyfunctional pendant groups is added to the reactor contents, while maintaining the reactor contents at the above-described reaction temperature and pH range. The monomeric ingredients of the monomeric mixture are so chosen that the glasstransition temperature (Tg) of the polymer produced, namely the polymeric particles having epoxy-functional pendant groups, is about 10 degrees Celsius to about 120 degrees Celsius, preferably about 30 degrees Celsius to about 90 degrees Celsius, and more preferably about 40 degrees Celsius to about 60 degrees Celsius.

For purposes of this invention, suitable emulsion-polymerizable monomers having epoxy-functional pendant groups include but are not limited to glycidyl acrylate, glycidyl methacrylate, allyl glycidyl ether, and combinations of these.

Also included within the monomeric mixture is about 1 part to about 60 parts, preferably about 20 parts to about 40 parts, of an ethylenically-unsaturated emulsion-polymerizable monomer selected from the group consisting of a mono vinylidene aromatic monomer, an alpha beta ethylenically-unsaturated carboxylic acid monomer, an alpha beta ethylenically-unsaturated carboxylic acid ester monomer and its monomeric derivatives, a vinyl ester monomer and its monomeric derivatives, and various combinations of these.

Accordingly, preferred mono vinylidene aromatic monomers include styrene ("ST"); alpha-methyl styrene ("AMS"); vinyl toluene; 2,4-dimethyl styrene; and combinations thereof.

Preferred alpha beta ethylenically-unsaturated carboxylic acid monomers include acrylic acid, methacrylic acid, itaconic acid, and combinations of these.

Preferred alpha beta ethylenically-unsaturated carboxylic acid ester monomers and monomeric derivatives thereof include methyl acrylate, ethyl acrylate, butyl acrylate, methyl methacrylate, butyl methacrylate, tertiary-butyl acrylate, 2-ethyl hexyl acrylate, and combinations of these.

Preferred vinyl ester monomers and monomeric derivatives thereof include vinyl acetate, vinyl methyl ether, vinyl ethyl ether, acrylonitrile, and combinations of these.

The monomeric mixture can, if desired, include an optional chain-transfer agent (or more than one optional chain-transfer agent) as well as an optional crosslinker ingredient.

The term "crosslinker" as used herein is understood to connote, but not be limited to, any monomer that contains at least two vinyl end groups. Thus, crosslinkers which are suitable for purposes of our present invention include, but are not limited to, divinylbenzene (DVB); ethylene glycol diacrylate (EGDA); hexanediol diacrylate (HDDA); neopentyl glycol diacrylate (NPGDA); tetraethylene glycol diacrylate (TEGDA); ethylene glycol dimethacrylate (EGDMA); trimethylol propane triacrylate (TMPTA); trimethylol propane trimethacrylate (TMPTMA); pentaerythritol triacrylate (PETA); pentaerythritol trimethacrylate (PETMA); allyl methacrylate (AMA); allyl acrylate (AA); allyl maleate (AM); diallyl maleate (DAM); polyethylene glycol diacrylate (PEGDA); polyethyleneglycol dimethacrylate (PEGDMA); and combinations of these.

The purpose of using a chain-transfer agent is to enable us to modify the molecular weight of the ultimate polymer that is produced as a result of crosslinking of the above-mentioned crosslinkable polymeric particles respectively having epoxy-functional and epoxy-reactive pendant groups or moieties. Use of chain-transfer agents is well-known by those skilled in the art; and a wide assortment of such are commercially-available.

Suitable chain-transfer agents include but are not limited to butyl mercaptopropionate; iso octyl mercapto propionic acid; bromoform; bromotrichloromethane;

carbon tetrachloride; alkyl mercaptans such as n-dodecyl mercaptan, tertiary-dodecyl mercaptan, octyl mercaptan, tetradecyl mercaptan, and hexadecyl mercaptan; alkyl thioglycolates such as butyl thioglycolate, isooctyl thioglycolate, and dodecyl thioglycolate; and thioesters; and combinations thereof.

Preferred chain-transfer agents include butyl mercaptopropionate, bromotrichloromethane, and iso octyl mercapto propionic acid.

In the laboratory, we prefer to slowly add the monomeric mixture to the reactor contents over, for example, a period of about 1 hour, while maintaining the desired reaction temperature and pH range. However, those skilled in the art can well appreciate that addition rates will vary for a variety of reasons, when producing commercial quantities in commercial-sized equipment.

At the completion of addition of the monomeric mixture to the reactor contents we prefer to hold the reactor contents at the desired reaction temperature for an additional hour, while maintaining the reaction temperature and the pH range, to optimize the desired polymerization reaction whereby emulsion polymer particles having pendant epoxy-functional groups are produced in the reactor. Those skilled in the art can again well appreciate that post-addition hold times will tend to vary for a variety of reasons when producing commercial quantities in commercial-sized equipment. We have found, however, that thus maintaining the pH range minimizes opening of the epoxy ring of the thus-produced epoxy-functional polymer.

Before the thus-produced evaporable oil-in-water emulsion can be used to form a film on a substrate the polymeric particles dispersed throughout the continuous phase must be caused to coalesce. While particle coalescence can be caused by natural forces, such as by evaporation of the evaporable components of the colloidal oil-in-water emulsion, we have found it desirable, at times, to add about 1 part to about 35 parts of an optional coalescing agent to 100 parts of our thus-produced colloidal oil-in-water emulsion.

Coalescing agents are often included in water-borne coating formulations to provide films that remain coherent when subjected to expected temperatures, wear-levels, and other "in-use" conditions. In this regard, well-known coalescing agents that are suitable for purposes of our invention include but are not limited to the alkyl and/or aromatic ethers of glycols such as ethylene glycol, diethylene glycol, triethylene glycol, propylene glycol, dipropylene glycol and/or tripropylene glycol, as well as the alkyl and/or aromatic esters of these glycols, and combinations of these.

To enable our thus-produced oil-in-water emulsion to be used to produce films possessing superior "leveling" qualities, moreover, we have also found it desirable, at yet other times, to add about 0.2 parts to about 4.0 parts of an optional leveling agent to 100 parts of our thus-produced oil-in-water emulsion.

Leveling agents are often employed to provide smooth films of uniform gloss, without the formation of ridges and swirls as might arise from various methods of application.

Suitable leveling agents for purposes of our invention include but are not limited to the ethoxylated alkyl phenols and the ethoxylated and/or propoxylated alcohols. Tributoxyethyl phosphate and its analogs are typically utilized by those skilled in the art as the leveling agents of choice.

Further, to enhance the ability of our thus-produced oil-in-water emulsion to "wet" a substrate surface, we have found it desirable, at still other times, to add about 0.02 parts to about 0.10 parts of an optional wetting agent to 100 parts of the thus-produced oil-in-water emulsion.

Wetting agents are often used to promote spreading of a coating formulation over a substrate during application. In this regard, suitable wetting agents for purposes of our present invention include but are not limited to fluorocarbon surfactants, alkali metal and amine salts of higher fatty acids such as sodium, potassium, ammonium and/or morpholine oleate and/or ricinoleate salts as well as certain nonionic surfactants that are typically utilized by those skilled in the art as wetting agents of choice.

When utilizing the above-mentioned optional ingredients we prefer to combine such together, if several are being utilized, in such a manner as to produce a uniform mixture and, thereafter, introduce the thus-produced uniform mixture into the oil-in-water emulsion over a period of about 15 to about 20 minutes. At this point, we have found it desirable, at still other times, to next add about 0.01 parts to about 0.10 parts of an optional anti-foaming agent to 100 parts of the oil-in-water emulsion.

Anti-foaming agents are commonly incorporated into surface coating formulations, such as floor polishes, to reduce and/or eliminate foam marks in the dried film. For purposes of this invention, suitable anti-foaming agents include but are not limited to fatty acids, fatty acid esters and salts, fatty acid sulfonates, blends of glycols and esters, and silicone polymer emulsions. Silicone emulsions are preferred for their greater efficiency and long-term activity. Organo-polysiloxanes and several proprietary silicone emulsions that are designed for water-based systems are also suitable for purposes of this invention.

A second oil-in-water emulsion is introduced into the first oil-in-water emulsion to produce the novel evaporable colloidal dispersion containing the crosslinkable polymeric material mentioned above. The second oil-in-water emulsion includes about 5 parts to about 95 parts of a polymer having pendant epoxy-reactive groups or moieties per 100 parts of crosslinkable polymeric material. In particular, in the preparation of the polymer having pendant epoxy-reactive moieties it may be desirable to co-polymerize an emulsion-polymerizable monomer having pendant epoxy-reactive moieties with an ethylenically-unsaturated emulsion-polymerizable monomer selected from the group consisting of a mono vinylidene aromatic monomer, an alpha beta ethylenically-unsaturated carboxylic acid monomer, an alpha beta ethylenically-unsaturated carboxylic acid ester monomer and its monomeric derivatives, a vinyl ester monomer and its monomeric derivatives, a monomeric derivative of an ethylenically-unsaturated dicarboxylic anhydride, and various combinations of these.

In this regard, preferred mono vinylidene aromatic monomers include styrene ("ST"); alpha-methyl styrene ("AMS"); vinyl toluene; 2,4-dimethyl styrene; and combinations thereof.

Also in this regard, preferred alpha beta ethylenically-unsaturated carboxylic acid monomers include acrylic acid, methacrylic acid, itaconic acid, and combinations of these.

Further in this regard, preferred alpha beta ethylenically-unsaturated carboxylic acid ester monomers and monomeric derivatives thereof include methyl acrylate, ethyl acrylate, butyl acrylate, methyl methacrylate, ethyl methacrylate, butyl methacrylate, isobutyl methacrylate, 2-ethyl hexyl methacrylate, and combinations of these.

Still further in this regard, preferred vinyl ester monomers and monomeric derivatives thereof include vinyl acetate, vinyl methyl ether, vinyl ethyl ether, acrylonitrile, and combinations of these.

The emulsion-polymerizable mixture of the second oil-in-water emulsion can, if desired, include an optional chaintransfer agent (or more than one optional chain-transfer agent) as well as an optional crosslinker ingredient.

As was briefly mentioned above, the first and second oil-in-water emulsions are combined to produce the novel evaporable colloidal dispersion of our invention. The colloidal dispersion thus obtained includes (1) polymeric particles having pendant epoxy-functional groups and (2) polymer having pendant epoxy-reactive moieties, each of which is separately dispersed throughout the continuous aqueous phase. The epoxy-reactive moieties are selected from the group consisting of amines, amides, carboxylic acid, and combinations of these.

Generally, the polymer having pendant epoxy-reactive moieties has a number-average molecular weight of at least 5,000. Reference hereinafter to the term "molecular weight" shall be understood to be reference to number-average molecular weight, unless otherwise indicated.

More particularly, when the pendant epoxy-reactive moiety of such a polymer is an amine, such polymer has a molecular weight of at least about 1,800 to as much as 50,000, preferably at least about 5,000 to as much as 40,000, and more preferably at least about 8,000 to as much as 35,000. When the pendant epoxy-reactive moiety of such a polymer is an amide, such polymer has a molecular weight of at least about 5,000 to as much as 50,000, preferably at least about 8,000 to as much as 40,000, and more preferably at least about 10,000 to as much as 35,000. When the pendant epoxy-reactive moiety of such a polymer is a carboxylic acid, such polymer has a molecular weight of at least about 5,000 to as much as 50,000, preferably at least about 8,000 to as much as 40,000, and more preferably at least about 10,000 to as much as 35,000.

The relative amounts of (1) polymeric particles having pendant epoxy-functional groups and (2) polymer having pendant epoxy-reactive moieties, in the evaporable dispersion, is effective, upon evaporation of the volatile components of the dispersion, to enable crosslinking to take place between the epoxy-functional groups and the epoxyreactive moieties at room temperature.

The thus-produced aqueous evaporable colloidal dispersion is typically "clean", meaning that it typically has no odor of un-reacted monomer and contains no coagulum. Further, such a colloidal dispersion typically is about 5 to about 60 weight percent non-volatiles. Still further, the thus-produced colloidal dispersion has been found to possess a shelf life of greater than one year.

While not wanting to be tied to theory, yet desirous of providing a complete disclosure, it is presently postulated that the thus-produced polymeric particles having pendant epoxy-functional groups are colloidal particles, generally spherical in shape.

Further, it is also presently postulated that such particles carry on their external surface a charged water layer (a so-called "electrical double layer") of negatively-charged particles and positively-charged particles spaced radially outwardly from the negatively-charged particles. This electrical double layer (also referred to as the "Stern layer") is believed to be substantial in magnitude, as a result of the relatively large hydration layer that is associated with the non-ionic emulsifiers which are utilized in the preparation of the epoxy functional group containing polymers discussed hereinbelow. Additionally, inclusion of about 0.2 parts to about 2.0 parts of a suitable non-ionic surfactant, per 100 parts of colloidal dispersion, has been found to further contribute to a relatively large hydration layer (or "Stern layer") which, in turn, has been shown to be effective for maintaining the epoxy-reactive moieties and the epoxy-functional groups in spaced-apart relationship in the evaporable dispersion prior to evaporation of the evaporable components of the dispersion.

We further postulate, after the colloidal dispersion has been spread onto a suitable substrate, that polymeric particles having epoxy-functional pendant groups are brought into close contact with polymer having epoxy-reactive pendant moieties by evaporation of the evaporable components of the colloidal dispersion. The result of such evaporation is that certain crosslinking reactions take place between the epoxyfunctional pendant groups of the above-mentioned polymeric particles and the epoxy-reactive pendant moieties of the above-mentioned polymer. The result is that crosslinked polymeric films, thus cast, have been found to provide durable, solvent-resistant and abrasion-resistant surface coatings that cure at room temperature.

For purposes of providing a full disclosure, non-ionic emulsifiers that are suitable for purposes of our invention include but are not limited to the alkanolamides, the amine oxides, the block polymers, the carboxylated alcohol ethoxylates, the ethoxylated alcohols, the ethoxylated alkyl phenols, the ethoxylated amines and/or amides, the ethoxylated fatty acids, the ethoxylated fatty esters and oils (animal & vegetable), the fatty esters (other than glycol, glycerol, and that sort), the fluorocarbon-based surfactants, the glycerol esters, the glycol esters, the lanolin-based derivatives, the lecithin & lecithin derivatives, the monoglycerides and their derivatives, the propoxylated and ethoxylated fatty acids and/or alcohols and/or alkyl phenols, the protein-based surfactants, the silicone-based surfactants, the sorbitan derivatives, and the sucrose esters and their derivatives. (See, for example, pages 286–292 of the 1986 North American edition of "McCutcheon's" Emulsifiers & Detergents, McCutcheon Division, MC Publishing Company, Glen Rock, N.J.)

Preferred non-ionic emulsifiers (or so-called non-ionic "surfactants") include the ethoxylated alcohols, the ethoxylated alkyl phenols, the propoxylated and ethoxylated fatty acids and/or alcohols and/or alkyl phenols.

Anionic emulsifiers that are suitable for purposes of our invention include but are not limited to the alkylaryl sulfonates, the sulfonated amines and amides, the detergent intermediates (e.g. the alcohols, the fatty acids, the alkyl aryl sulfonic acids), the diphenyl sulfonate derivatives, the ethoxylated alkyl phenols, the heterocyclic-type emulsifiers, the isethionates, the lanolin-based derivatives, lecithin and the lecithin derivatives, the monoglycerides and their derivatives, the olefin sulfonates, the phosphate derivatives, the phosphate esters, the polyamino carboxylic acids and their related sequestering agents, the propoxylated and the ethoxylated fatty acids and/or alcohols and/or alkyl phenols, the protein-based surfactants, the sarcosine derivatives, the silicone-based surfactants, the sorbitan derivatives, the sucrose esters and their derivatives, the sulfates and sulfonates of ethoxylated alkyl phenols, the sulfates and sulfonates of oils and fatty acids, the sulfates of alcohols, the sulfates of ethoxylated alcohols, the sulfates of fatty esters, the sulfonates of benzene and/or toluene and/or xylene, the sulfonates of condensed naphthalenes, the sulfonates of the dodecyl and the tridecyl benzenes, the sulfonates of naphthalene and the alkyl naphthalenes, the sulfonates of petroleum, the sulfosuccinates and their derivatives, the taurates, the thio and the mercapto derivatives, and the tridecyl and the dodecyl benzene sulfonic acids. (See, for example, pages 286–292 of the 1986 North American edition of "McCutcheon's" Emulsifiers & Detergents, McCutcheon Division, MC Publishing Company, Glen Rock, N.J.)

Preferred anionic emulsifiers (or so-called anionic "surfactants") include the sulfates and the sulfonates of the ethoxylated alkyl phenols and/or the fatty acids, the sulfates of the alcohols and/or the ethoxylated alcohols, and the sulfosuccinates and their derivatives.

Suitable water-soluble free-radical initiators, for purposes of the present invention, include but are not limited to peracetic acid, various peroxides, various persulfates, various perphosphates, various perborates, various percarbonates, and various azo compounds. For example, those water-soluble initiators which are suitable and which may be mentioned at this point include hydrogen peroxide, hydroperoxides such as tertiary-butyl hydroperoxide, and sodium, potassium, ammonium and barium persulfate as well as acetyl peroxide.

Suitable azo-type free-radical initiators, for purposes of this disclosure, include but are not limited to azo amides such as 2,2,-azobis (isobutyramide) dihydrate; 2,2,-azobis[2-methyl-N-(2-hydroxyethyl)propionamide]; and 2,2'-azobis {2-methyl-N-[ 1,1-bis(hydroxymethyl)ethyl]propionamide}, respectively available from Wako Chemicals, Inc., of Dallas, Tex., under the Wako brand names "VA-088", "VA-086" and "VA-082".

Preferred initiators include certain inorganic compounds such as ammonium persulfate (APS) and potassium persulfate.

The amount of initiator used is normally about 0.10 parts to about 3.0 parts per 100 parts of crosslinkable polymeric material in the evaporable colloidal dispersion, and preferably about 0.25 parts to about 0.6 parts.

Yet another water-soluble free-radical initiator suitable for purposes of the present invention is the socalled "redox combination" which may consist of a water-soluble persulfate as the "oxidizing" component of the redox combination and a hydrosulfite, e.g. sodium hydrosulfite, as the "reducing" component of the redox combination. Water-soluble bisulfites, metabisulfites and/or thiosulfates, and formaldehyde sulfoxilate may be used in lieu of the hydrosulfites. Generally useful proportions of the above-indicated persulfate-hydrosulfite system are about 0.01 parts to about 1.0 part for the oxidizing component and about 0.015 parts to about 1.5 parts for the reducing component, based upon 100 parts of crosslinkable polymeric material in the colloidal dispersion.

Suitable buffering agents include but are not limited to various bicarbonates such as ammonium bicarbonate, potassium bicarbonate ("KHCO$_3$"), sodium bicarbonate ("NaHCO$_3$"), and combinations thereof.

In the following tables and examples all proportions are by weight unless otherwise specified.

EXAMPLE 1

Preparation of Epoxy-Functional Polymer

An oil-in-water (or so-called "water out") emulsion containing polymeric particles having epoxy-functional pendant groups or moieties was prepared as follows.

A 2-liter 4-necked polymerization reactor was set up and was fitted with a stirrer, a reflux condenser, a thermometer, and a nitrogen ("N$_2$") inlet tube. The reactor charge presented in Table I, below, was introduced into the polymerization reactor (the addition rate may vary) and was thereafter heated, with agitation, under an inert-gas (e.g., N$_2$) atmosphere to a temperature of 90 degrees Celsius. While the temperature of the reactor charge was thus being maintained at the desired reaction temperature of 90 degrees Celsius, plus or minus two (2) degrees Celsius, the initiator feed of Table II, below, and the monomer feed of Table III, below, were simultaneously separately added to the 4-necked polymerization reactor, each at a uniform rate over a period of one (1) hour, thereby producing a polymeric emulsion, also characterized as a "latex". The reactor contents were thereafter held at 90° C. for an additional one (1) hour period. The thus-produced polymeric emulsion (or "latex") was found to have a pH of 3.8, a viscosity of 26 centipoises ("cps."), and a "total solids" content of 35.1 weight percent. The thus-produced latex was then cooled from 90° C to room temperature and thereafter filtered through cheese cloth.

The resulting, thus-produced polymeric particles are more particularly characterized as being copolymeric particles that have or possess epoxy-functional pendant groups or moieties, wherein such particles consist of 40 parts GMA monomeric units, 50 parts MMA monomeric units, and 10 parts BA monomeric units, per 100 parts of copolymer. Such copolymer was determined by the titration method outlined in ASTM D-1652-87, as having an epoxy equivalent weight, corrected for solids, of 412. The copolymer was determined by Differential Scanning Calorimeter ("DSC") as having a glass-transition temperature (Tg) of 44 degrees Celsius.

The reactor charge presented in Table I, below, was prepared as follows. The ingredients were weighed into a suitable size beaker and mixed to uniformity and then charged to the reactor.

TABLE I

| Ingredients | Reactor Charge Function | Parts |
|---|---|---|
| De-ionized Water | Continuous Phase | 333.50 |
| Abex JKB | Anionic Emulsifier | 5.50 |
| Triton X-305 | Non-ionic Emulsifier | 19.10 |
| Copper Sulfate Solution | Accelerator | 6.00 |

De-ionized water functions as the continuous phase. The ethoxylated fatty alcohol sulfate, commercially available under the brand name "Abex JKB" by Alcolac Inc. of Baltimore, Md., functions as the anionic emulsifier. Octylphenoxy polyethoxyethanol, commercially available under the brand name "Triton X-305" by The Rohm and Haas Company of Philadelphia, Pa., functions as the non-ionic emulsifier. The copper sulfate solution is, more particularly, 0.01 molar copper sulfate in de-ionized water. The copper sulfate solution functions as an accelerator for the polymerization reaction.

The initiator feed presented in Table II, below, was prepared by simply blending the deionized water and hydrogen peroxide at room temperature.

TABLE II

| | Initiator Feed | |
|---|---|---|
| Ingredients | Function | Parts |
| De-ionized Water | Aqueous Carrier | 288.10 |
| $H_2O_2$ | Free Radical Initiator | 11.90 |

De-ionized water functions as the aqueous carrier. Hydrogen peroxide ("$H_2O_2$"), which functions as the water-soluble free-radical initiator, is commercially available as a 30 weight-percent aqueous solution.

The monomer feed presented in Table III, below, was prepared as follows. The monomers and the chain-transfer agent were weighed into a suitable size beaker and mixed together with agitation and then charged to an addition funnel which is attached to the reactor.

TABLE III

| | Monomer Feed | |
|---|---|---|
| Ingredients | Function | Parts |
| GMA | Epoxy-containing Monomer | 133.70 |
| BA | Other Monomer | 33.40 |
| MMA | Other Monomer | 167.10 |
| BMP | Chain-transfer Agent | 1.70 |

The various ingredients listed in Table III, above, are each commercially available from various well-known sources. The glycidyl methacrylate ("GMA") functions as the emulsionpolymerizable monomer having epoxy-functional pendant groups. The butyl acrylate ("BA") and the methyl methacrylate ("MMA") are each an ethylenically-unsaturated emulsion-polymerizable monomer. The butyl mercaptoproprionate ("BMP") functions as a chain-transfer agent.

EXAMPLE 2

Preparation of Another Epoxy-Functional Polymer

Yet another oil-in-water emulsion containing polymeric particles having epoxy-functional pendant groups was prepared, substantially following the procedures of Example 1, except in the following two regards. First, the reactor charge, the initiator charge, and the monomer feed all differed, in one way or another from the charges and feed of Example 1, and such differences are discussed in connection with Tables IV, V and VI, below. Second, the initiator charge was incorporated, as quickly as was possible, into the contents of the polymerization reactor; and such incorporation of initiator was followed by uniform addition of the monomer feed over a one-hour period of time.

The thus-produced latex was found to have a pH of 7.7, a viscosity of 24 cps., and a "total solids" or "percent non-volatiles" ("% NV") content of 33% NV (weight percent). The thus-produced latex was then cooled from 90° C. to room temperature and thereafter filtered through cheese cloth. The coagulum level was less than 0.01 weight percent based upon total weight of the thus-produced latex.

The resulting, thus-produced polymeric particles are more particularly characterized as being copolymeric particles having epoxy-functional pendant groups and consisting of 20 parts GMA monomeric units, 50 parts MMA monomeric units, and 30 parts BA monomeric units, per 100 parts of copolymer. Such copolymer was determined by the method described above under Example I as having an epoxy equivalent weight, corrected for solids, of 830. The copolymer was determined by DSC as having a Tg of 45° C.

The reactor charge presented in Table IV, below, was prepared as follows. The ingredients were weighed into a suitable size beaker and mixed to uniformity and then charged to the reactor.

TABLE IV

| | Reactor Charge | |
|---|---|---|
| Ingredients | Function | Parts |
| De-ionized Water | Continuous Phase | 638.00 |
| Triton X-305 | Non-ionic Emulsifier | 17.90 |
| Abex JKB | Anionic Emulsifier | 5.20 |

The initiator feed presented in Table V, below, was prepared by simply blending the ingredients together. A clear solution was obtained.

TABLE V

| | Initiator Feed | |
|---|---|---|
| Ingredients | Function | Parts |
| De-ionized Water | Aqueous Carrier | 19.20 |
| APS | Free Radical Initiator | 0.20 |
| $NaHCO_3$ | Buffering Agent | 0.10 |

De-ionized water functions as the aqueous carrier. Ammonium persulfate ("APS") functions as the water-soluble free-radical initiator. Sodium bicarbonate ("$NaHCO_3$") functions as the buffering agent and thus helps maintain the pH of the reaction medium.

The monomer feed presented in Table VI, below, was prepared as described above under Example 1.

TABLE VI

| | Monomer Feed | |
|---|---|---|
| Ingredients | Function | Parts |
| GMA | Epoxy-containing Monomer | 63.40 |
| MMA | Other Monomer | 159.00 |
| BA | Other Monomer | 95.20 |
| BMP | Chain-transfer Agent | 1.80 |

EXAMPLE 3

Still Another Epoxy-Functional Polymer

Still another oil-in-water emulsion, containing epoxyfunctional polymer, was prepared substantially following the procedures of Example 2, except in the following two regards. First, monomer feed was divided into two parts, as set forth in Table VII, below.

TABLE VII

| | Monomer Feed | |
|---|---|---|
| | Function | Parts |
| Part "A" Ingredients | | |
| MMA | Other Monomer | 159.00 |
| BA | Other Monomer | 63.50 |
| BMP | Chain-transfer Agent | 1.30 |
| Part "B" Ingredients | | |
| GMA | Epoxy-containing Monomer | 63.40 |
| BA | Other Monomer | 31.70 |
| BMP | Chain-transfer Agent | 0.50 |

Part "A" was prepared as described above under Example 1. The resultant monomeric mixture of part "A" was thus charged to the addition funnel, mentioned above as being attached to the reactor.

Part "B" was prepared as described above under Example 1. The resultant monomeric mixture of part "B" was charged to a second addition funnel, also attached to the reactor.

The reactor charge and initiator feed ingredients and proportions that were utilized are as set forth in Tables IV and V of Example 2, above.

The second regard, mentioned above, in which the preparation of Example 3 differed from the preparation of Example 2 will now be discussed.

Following incorporation of the initiator charge into the contents of the polymerization reactor, part "A" was incorporated into the reactor contents over a 30-minute period of time followed by incorporation of part "B", also over a 30-minute period, thereby producing a polymeric latex. The reactor contents were thereafter held at 90° C. for an additional 1-hour period. The thus-produced latex was found to have a pH of 7.7, a viscosity of 8.9 cps., and a total solids content of 33.4% NV. The thus-produced latex was then cooled from 90° C. to room temperature and filtered through cheese cloth.

The coagulum level was 0.01 weight percent based upon total weight of the thus-produced latex.

The resulting, thus-produced polymeric particles are more particularly characterized as being copolymeric particles having epoxy-functional pendant groups and consisting of 20 parts GMA monomeric units, 50 parts MMA monomeric units, and 30 parts BA monomeric units, per 100 parts of copolymer. Such copolymer was determined by the ASTM D-1652-87 method as having an epoxy equivalent weight, corrected for solids, of 860. The copolymer was determined by DSC as having a Tg of 43° C.

EXAMPLE 4

Yet Another Epoxy-Functional Polymer

Yet another oil-in-water emulsion, containing epoxyfunctional polymer, was prepared substantially following the procedures of Example 3, except in the following two regards. First, the reactor charge, initiator feed and monomer feed ingredients and proportions that were utilized are as set forth in Tables VIII, IX, and X, below. Second, part "A" of the monomer feed of Table X, below, included ethylene glycol dimethacrylate ("EGDMA") as a monomeric "crosslinker" ingredient.

The thus-produced polymeric latex was found to have a pH of 7.4, a viscosity of 6.6 cps., and a total solids content of 33.2% NV. The thus-produced latex was then cooled from 90° C. to room temperature.

The resulting polymeric particles are more particularly characterized as being copolymeric particles having epoxyfunctional pendant groups and consisting of 19.8 parts GMA monomeric units, 49.5 parts MMA monomeric units, 29.7 parts BA monomeric units, and 1.0 parts EGDMA monomeric units, per 100 parts of copolymer. Such copolymer was determined by the ASTM D-1652-87 method as having an epoxy equivalent weight, corrected for solids, of 940. The copolymer was determined by DSC as having a Tg of 45° C.

The reactor charge presented in Table VIII, below, was prepared as described in previous examples.

TABLE VIII

| Ingredients | Reactor Charge Function | Parts |
| --- | --- | --- |
| De-ionized Water | Continuous Phase | 625.47 |
| Triton X-305 | Non-ionic Emulsifier | 9.10 |
| Fizul 201-11 | Anionic Emulsifier | 20.50 |

De-ionized water functions as the continuous phase. The "Triton X-305" ingredient functions as the non-ionic emulsifier. The "Fizul 201-11" ingredient, which functions as an anionic emulsifier, is characterized structurally as disodium ethoxyalcohol sulfosuccinate half ester, and is commercially available from Finetex, Inc., of Elmwood Park, N.J.

The initiator feed presented in Table IX, below, was prepared by simply blending the ingredients together. A clear solution was obtained.

TABLE IX

| Ingredients | Initiator Feed Function | Parts |
| --- | --- | --- |
| De-ionized Water | Aqueous Carrier | 19.34 |
| APS | Free Radical Initiator | 2.00 |
| NaHCO$_3$ | Buffering Agent | 1.00 |

The monomer feed was divided into two parts, as set forth in Table X, below.

TABLE X

| | Monomer Feed Function | Parts |
| --- | --- | --- |
| Part "A" Ingredients | | |
| MMA | Other Monomer | 159.00 |
| BA | Other Monomer | 63.50 |
| EGDMA | Crosslinker | 3.19 |
| BMP | Chain-transfer Agent | 1.30 |
| Part "B" Ingredients | | |
| GMA | Epoxy-containing Monomer | 63.40 |
| BA | Other Monomer | 31.70 |
| BMP | Chain-transfer Agent | 0.50 |

Part "A" and Part "B" were each prepared as described in Example 3.

EXAMPLE 5

Still Another Epoxy-Functional Polymer

Still another oil-in-water emulsion, containing epoxyfunctional polymer, was prepared substantially following the procedures of Example 4 except that the amount of EGDMA crosslinker specified in Table X, above, appeared in part "B", not part "A", of the monomer feed. Otherwise the reactor charge, the initiator feed, and the monomer feed ingredients and proportions were as set forth in Tables VIII, IX, and X above.

The thus-produced polymeric latex was found to have a pH of 7.1, a viscosity of 6.7 cps., and a total solids content of 33.3% NV. The thus-produced latex was then cooled from 90° C. to room temperature.

The resulting copolymeric particles are characterized as substantially the same as the copolymeric particle of Example 4, except that the polymer chains near the surface of the particles are cross-linked.

EXAMPLE 6

Preparation of Epoxy-Reactive Polymer

An oil-in-water (or so-called "water out") emulsion containing polymeric particles having epoxy-reactive pendant groups or moieties was prepared as follows.

A 2-liter, 4-necked polymerization reactor was set up and was fitted with a stirrer, a reflux condenser, a thermometer, and a nitrogen ("$N_2$") inlet tube. The reactor charge presented in Table XI, below, was introduced into the polymerization reactor and was thereafter heated, with agitation, under an inert-gas (e.g., $N_2$) atmosphere to a temperature of 80 degrees Celsius. While the temperature of the reactor charge was thus being maintained at the desired reaction temperature of 80 degrees Celsius, the initiator charge presented in Table XII, below, was incorporated into the heated-and-agitated reactor contents followed by the incorporation of the monomer feed of Table XIII, below, into the reactor contents at a uniform rate over a 1-hour period of time, thereby producing a polymeric emulsion ("latex"). The reactor contents were thereafter held at 80° C. for an additional 1-hour period. The thus-produced polymeric emulsion (or "latex") was found to have a pH of 3.4, a viscosity of 10.0 cps., and a total solids content of 33% NV. Further, the latex was found to have only 0.01% coagulum and only 0.02% unreacted monomer.

The thus-produced latex was then cooled from 80° C. to room temperature, and was thereafter filtered through cheese cloth.

The resulting, thus-produced polymeric particles are more particularly characterized as being copolymeric particles that have or possess epoxy-reactive pendant groups or moieties, wherein such particles consist of 25 parts ST monomeric units, 35 parts MMA monomeric units, 30 parts BA monomeric units, and 10 parts MAA monomeric units, per 100 parts of copolymer. Methacrylic acid, the epoxyreactive monomer selected, provided the thus-produced copolymeric particle with a "carboxylic acid" type of epoxyreactive pendant group or moiety.

Such copolymer was determined by Gel Permeation Chromatography ("GPC") as having a molecular weight of 36,400 and an epoxy-reactive equivalent weight, corrected for solids, of 2,670, as calculated, based on monomer composition. The copolymer was determined by DSC as having a Tg of 70° C.

The reactor charge presented in Table XI, below, was prepared as in Example 1.

TABLE XI

| Ingredients | Reactor Charge Function | Parts |
|---|---|---|
| De-ionized Water | Continuous Phase | 62.70 |
| Abex JKB | Anionic Emulsifier | 2.15 |
| Polystep RA-35S | Anionic Emulsifier | 0.92 |

"Polystep RA-35S", commercially available from Stepan Company of Northfield, Ill., functions as another anionic emulsifier. The chemical structure of "Polystep RA-35S" is characterized as a mixture of the sodium salt of sulfonated nonylphenoxy polyethyleneoxy ethanol and sodium maleate.

The initiator feed presented in Table XII, below, was prepared by simply blending the ingredients together. A clear solution was obtained.

TABLE XII

| Ingredients | Initiator Charge Function | Parts |
|---|---|---|
| De-ionized Water | Aqueous Carrier | 1.90 |
| APS | Free Radical Initiator | 0.13 |

The monomer feed presented in Table XIII, below, was prepared by weighing the respective monomers into a suitable size beaker, mixing together with agitation and then charging to an addition funnel which is attached to the reactor.

TABLE XIII

| Ingredients | Monomer Feed Function | Parts |
|---|---|---|
| MAA | Epoxy-reactive Monomer | 3.22 |
| ST | Other Monomer | 8.05 |
| MMA | Other Monomer | 11.27 |
| BA | Other Monomer | 9.66 |

EXAMPLE 7

Preparation of Another Epoxy-Reactive Polymer

Another oil-in-water emulsion containing polymeric particles having epoxy-reactive groups was prepared from the polymerization equipment mentioned in Example 6. The reactor charge presented in Table XIV, below, was introduced into the polymerization reactor and was thereafter heated, with agitation, under an inert-gas ("$N_2$") atmosphere to a temperature of 80° C. While the temperature of the reactor charge was thus being maintained at the desired reaction temperature of 80° C., 10 weight percent of the total amount of the initial addition feed presented in Table XV, below, was charged into the heated-and-agitated reactor contents while the 80° C. reaction temperature was being maintained. The reactor contents were then allowed to react for a time period of 15 minutes. Thereafter, the remainder of the initial addition feed as well as the delayed addition feed presented in Table XVI, below, were each uniformly incorporated into the reactor contents, from separate addition funnels, over a 1-hour period of time, thereby producing a polymeric emulsion, also characterized as a "latex". The reactor contents were subsequently held at 80° C. for an additional 2-hour period. The thus-produced polymeric emulsion (or "latex") was found to have a pH of 5.0, a viscosity of 10.0 cps., and a total solids content of 48.8% NV. Further, the latex was found to have less than 0.1% coagulum and only 0.5% unreacted monomer, based on total weight of the latex.

The thus-produced latex was then cooled from 80° C. to room temperature and thereafter filtered through cheese cloth.

The resulting, thus-produced polymeric particles are more particularly characterized as being copolymeric particles that have or possess epoxy-reactive pendant groups or moieties, wherein such particles consist of 75 parts EA monomeric units, 18 parts MMA monomeric units, and 7 parts NMM monomeric units, per 100 parts of copolymer. N-methylol methacrylamide ("NMM"), the epoxy-reactive monomer selected, provided the thus-produced copolymeric particle with an "amide" type of epoxy-reactive pendant group or moiety. The N-methylol methacrylamide utilized was obtained from the American Cyanamid Company of Wayne, N.J.

Such N-methylol methacrylamide, more particularly, is a 60 weight-percent dispersion of NMM in water.

The thus-produced copolymer was determined by Gel Permeation Chromatography ("GPC") as having a molecular weight of 35,700 and an epoxy-reactive equivalent weight, corrected for solids, of 3,276, as calculated, based on monomer composition. The copolymer was determined by DSC as having a Tg of minus 12° C.

The reactor charge presented in Table XIV, below, was prepared as described in previous examples.

TABLE XIV

| Ingredients | Reactor Charge Function | Parts |
|---|---|---|
| De-ionized Water | Continuous Phase | 255.5 |
| Aerosol NPES 930 | Anionic Emulsifier | 12.2 |
| Methanol | Aids in Monomer Transport | 24.4 |
| NaHCO$_3$ | Buffering Agent | 4.9 |
| APS | Free Radical Initiator | 48.8 |

The chemical structure of the "Aerosol NPES 930" ingredient is sulfated ethoxylated nonylphenol. In the reactor charge, the "Aerosol NPES 930" ingredient functions as the anionic emulsifier. The "Aerosol NPES 930" ingredient was obtained from American Cyanamid of Wayne, N.J.

In the reactor charge, the methanol aids in the transport of monomers through the continuous phase (deionized water). The sodium bicarbonate ("NaHC03") functions as a buffering agent. The ammonium persulfate ("APS") ingredient presented in Table XIV, above, which functions as a free-radical initiator, is, more particularly, a 10 weight-percent solution of APS in de-ionized water.

The initial addition feed presented in Table XV, below, was prepared as follows. A solution was prepared, as described in previous examples, by combining the "Aerosol NPES 930", methanol and sodium metabisulfite ingredients in the de-ionized water. While such solution was kept wellagitated, a monomeric mixture comprising the EA and the MMA was slowly added thereto until a uniform monomer pre-emulsion was produced.

TABLE XV

| Ingredients | Initial Addition Feed Function | Parts |
|---|---|---|
| De-ionized Water | Continuous Phase | 122.0 |
| Aerosol NPES 930 | Anionic Emulsifier | 12.2 |
| Methanol | Aids in Monomer Pre-emulsion | 24.4 |
| Na$_2$S$_2$O$_5$ | Reducing Agent | 1.0 |
| EA | Other Monomer | 366.0 |
| MMA | Other Monomer | 87.8 |

In the initial addition feed, the "Aerosol NPES 930" ingredient functions as the anionic emulsifier. The methanol helps in preparation of a stable pre-emulsion which maintains uniformity throughout the delayed addition time. The sodium metabisulfite ("Na$_2$S$_2$O$_5$") ingredient, also occasionally referred to as "sodium pyrosulfite" by those skilled in the art, functions as a reducing agent and thus catalyzes the decomposition of the "APS" ingredient.

The delayed addition feed presented in Table XVI, below, was prepared by blending the two ingredients together. A clear solution was obtained.

TABLE XVI

| Ingredients | Delayed Addition Feed Function | Parts |
|---|---|---|
| De-ionized Water | Continuous Phase | 42.7 |
| NMM | Epoxy-reactive Monomer | 28.1 |

Examples 8-11 and 12-16, respectively presented below in Tables XVII and XVIII, are illustrative of the novel dispersions of our present invention. Such dispersions, mentioned above as being crosslinkable yet possessing shelfstorage stability of 1-year or more, can be utilized to produce durable, abrasion-resistant surface coatings that crosslink (or "cure") at room temperature.

TABLE XVII

| | Crosslinkable Dispersions of Examples 8-11 | | | | |
|---|---|---|---|---|---|
| | | Parts | | | |
| Ingredients | Function | Ex. 8 | Ex. 9 | Ex. 10 | Ex. 11 |
| Water | Continuous Phase | 38.82 | 19.57 | 25.77 | 23.42 |
| Triton X-305 | Non-ionic Emulsifier | 0.50 | 0.63 | 0.63 | 0.63 |
| DEGMEE | Coalescing Agent | 8.00 | 10.00 | 10.00 | 10.00 |
| Aquaplus 100S | Epoxy-reactive Polymer | 25.36 | 17.14 | 39.90 | 28.52 |
| Zonyl FSE | Wetting Agent | 1.00 | 1.25 | 1.25 | 1.25 |
| TBEP | Plasticizer/Leveling Aid | 0.50 | 0.62 | 0.63 | 0.63 |
| Example 3 | Epoxy-functional Polymer | 28.52 | 50.79 | 21.82 | 36.30 |

The dispersions of Examples 8-11 were prepared by adding the ingredients in the order as listed (i.e., beginning with the non-ionic emulsifier and ending with the epoxy-functional polymer), with good agitation, at room temperature, to tap water. Finally, after the epoxy functional polymer was added, the agitation was continued for an additional 30 minutes. The milky-white dispersions thus obtained were filtered through cheese cloth and bottled. Generally speaking, there was very little coagulum (less than 0.1%) in the above dispersions.

TABLE XVIII

| | Crosslinkable Dispersions of Examples 12-16 | | | | | |
|---|---|---|---|---|---|---|
| | | Parts | | | | |
| Ingredients | Function | Ex. 12 | Ex. 13 | Ex. 14 | Ex. 15 | Ex. 16 |
| Water | Cont. Phase | 23.42 | 33.78 | 33.49 | 14.90 | 27.55 |
| Triton X-305 | Non-ionic Emulsifier | 0.63 | 0.00 | 0.00 | 0.63 | 0.63 |
| DEGMEE | Coalescing Agent | 10.00 | 4.00 | 3.00 | 10.00 | 10.00 |
| DPGMME | Coalescing Agent | 0.00 | 4.00 | 5.00 | 0.00 | 0.00 |
| Aquaplus 100S | Epoxy-reactive Polymer | 28.52 | 0.00 | 0.00 | 0.00 | 0.00 |
| Zonyl FSE | Wetting Agent | 1.25 | 1.00 | 1.00 | 1.25 | 1.25 |
| TBEP | Plasticizer/Leveling Aid | 0.63 | 1.00 | 1.00 | 0.31 | 0.31 |
| Example 3 | Epoxy-functional Polymer | 0.00 | 50.30 | 51.82 | 32.58 | 32.58 |
| Example 5 | Epoxy-functional Polymer | 35.55 | 0.00 | 0.00 | 0.00 | 0.00 |
| Example 6 | Epoxy-reactive Polymer | 0.00 | 0.00 | 0.00 | 40.33 | 0.00 |
| Example 7 | Epoxy-reactive Polymer | 0.00 | 0.00 | 0.00 | 0.00 | 27.68 |
| Interez J60-8290 | Epoxy-reactive Polymer | 0.00 | 5.92 | 4.69 | 0.00 | 0.00 |

The dispersions of Examples 12-16 were prepared in the same manner as Examples 8-11 described above.

In the preparation of the crosslinkable dispersions of Examples 8-16, tap water was utilized. In the preparation of the dispersions of Examples 8-12, 15 and 16, Triton X-305 was utilized as the non-ionic emulsifier.

In the preparation of the disperions of Examples 8-16, diethylene glycol monoethyl ether ("DEGMEE") functions as the coalescing agent. In the preparation of the disperions of Examples 13 and 14, dipropylene glycol monomethyl ether ("DPGMME") was utilized as yet another coalescing agent, in addition to DEGMEE.

Aquaplus 100S, which functioned as the epoxy-reactive polymer in the dispersions of Examples 8-12, is more particularly characterized as an amine-containing acrylic polymer emulsion, wherein the acrylic polymer portion of the emulsion has pendant amine-functional moieties. The aminecontaining acrylic polymer within the emulsion has an indeterminable molecular weight because it is at least partially crosslinked. Evidence of such crosslinking is clearly shown in Tables XXII and XXIII, below, which indicate that Example "B", prepared from Aquaplus 100S (See Table XX below), is insoluble in the solvents acetone and Butyl Cellosolve. We have further found that Aquaplus 100S is not soluble in tetrahydrofuran ("THF"), a known solvent for a wide variety of non-crosslinked polymeric materials. The Aquaplus 100S was obtained from the Rohm & Haas Company of Philadelphia, Pa.

Interez J60-8290, which functioned as the epoxy-reactive polymer in the dispersions of Examples 13 and 14, is more particularly characterized as a non-oxygenated waterdispersible amine-containing adduct of polyethylene-amine with an epoxy resin. Still more particularly, such an adduct is formed via reaction between some of the amine groups of the polyethylene-amine with the epoxy groups of the epoxy resin, whereby the remainder of the amine groups of the polyethylene-amine are available for crosslinking with epoxyreactive polymer contained within the dispersions of our invention. This is illustrated by Examples 13 and 14 in Table XVIII, above. Interez J60-8290, which has been diluted to 40% NV with tap water, is obtained from Interez, Incorporated, of Louisville, Ky. Interez J60-8290, which has a molecular weight of 1800-2000, is obtained as a 60% non-volatiles ("% NV") in a liquid mixture consisting of 95.5% 2-propoxyethanol and 4.5% glacial acetic acid.

The epoxy-reactive polymer of Example 6 was utilized to prepare the dispersion of Example 15. The epoxy-reactive polymer of Example 7 was utilized to prepare the dispersion of Example 16.

In the preparation of the dispersions of Examples 8-16, Zonyl FSE functioned as the wetting agent. The "Zonyl FSE" ingredient, presented in Tables XVII and XVIII above, is, more particularly, a 1 weight-percent solution of Zonyl FSE in water. Zonyl FSE, commercially available from The Du Pont Company, Chemical and Pigment Dept., of Wilmington, Delaware, is a fluorochemical surfactant of the type $(R'CH_2CH_2O)_2P(O)(ONH_4)$, where $R'$ is $F\{CF_2CF_2\}_{3-8}$.

In the preparation of the dispersions of Examples 8-16, tributoxyethyl phosphate ("TBEP") functioned as a plasticizer as well as a leveling aid.

In the preparation of the disperions of Examples 8-11 & 13-16, the epoxy-functional polymer of Example 3 was utilized to provide the polymeric particles having epoxy-functional groups or moieties. In the preparation of the disperion of Example 12, the epoxy functional polymer of Example 5, above, was utilized to provide the polymeric particles having epoxyfunctional groups or moieties.

Selected physical properties of the crosslinkable dispersions of Examples 8-16 were determined and are set forth in Table XIX, below.

TABLE XIX

Selected Physical Properties of Crosslinkable Dispersions

| Dispersions | pH | cps. | % NV | Ratio |
|---|---|---|---|---|
| Example 8 | 7.0 | 10.0 | 20.0 | 56:44 |
| Example 9 | 7.2 | 11.5 | 25.0 | 70:30 |
| Example 10 | 7.2 | 11.7 | 25.0 | 30:70 |
| Example 11 | 7.1 | 12.5 | 25.0 | 50:50 |
| Example 12 | 7.2 | 27.8 | 25.0 | 50:50 |
| Example 13 | 7.1 | 8.3 | 20.0 | 87:13 |
| Example 14 | 7.0 | 8.0 | 20.0 | 90:10 |
| Example 15 | 7.1 | 8.3 | 25.0 | 55:45 |
| Example 16 | 5.3 | 7.5 | 25.0 | 44:56 |

In Table XIX, above, the viscosity of the crosslinkable dispersions of Examples 8-16 was measured in units of centipoises ("cps."). The "total solids" or weight percent non-volatiles ("% NV"), is based upon total weight of the dispersion. The ratio value indicated is the weight of epoxy-function polymer to weight of epoxy-reactive polymer, in the dispersion, on a total weight-of-solids basis.

The crosslinkable dispersions of Examples 8-16, presented in Table XIX, above, were observed to be stable after more than 1-year storage at approximately 25° C. (room temperature), exhibiting no significant change in viscosity over such period of time.

Tables XX and XXI, below, present certain dispersions, respectively identified as Examples "A" through "C" and Examples "D" through "F", all of which "lettered" examples are beyond the scope of this invention. In particular, Examples "A" through "F" are illustrative of dispersions which include either an epoxy-functional polymer or an epoxyreactive polymer, but not both.

TABLE XX

Dispersions "A" through "C"

| Ingredients | Function | Parts A | B | C |
|---|---|---|---|---|
| Water | Continuous Phase | 62.67 | 44.40 | 32.00 |
| Triton X-305 | Non-ionic Emulsifier | 0.00 | 0.50 | 0.50 |
| DGMEE | Coalescing Agent | 3.00 | 8.00 | 8.00 |
| Zonyl FSE | Wetting Agent | 1.00 | 1.00 | 1.00 |
| Interez J60-8290 | Epoxy-reactive Polymer | 33.33 | 0.00 | 0.00 |
| Aquaplus 100S | Epoxy-reactive Polymer | 0.00 | 45.60 | 0.00 |
| TBEP | Plasticizer/ Leveling Aid | 0.00 | 0.50 | 0.50 |
| Example 3 | Epoxy-functional Polymer | 0.00 | 0.00 | 58.00 |

The identity of the various ingredients presented in Table XX, immediately above, is as discussed further above in connection with Tables XVII and XVIII.

The dispersions of Examples "A" through "C" were prepared by adding the ingredients in the order listed (i.e., beginning either with Triton X-305 or DGMEE and continuing on down to a suitable epoxy-reactive polymer or a plasticizer), with good agitation, at room temperature, to tap water. Finally, after the last ingredient was added, the agitation was continued for an additional 30 minutes. The milky-white dispersions were filtered through cheese cloth and bottled.

TABLE XXI

| | | Dispersions "D" through "F" | | |
|---|---|---|---|---|
| | | Parts | | |
| Ingredients | Function | D | E | F |
| Water | Continuous Phase | 37.67 | 32.00 | 38.24 |
| Triton X-305 | Non-ionic Emulsifier | 0.00 | 0.50 | 0.63 |
| DGMEE | Coalescing Agent | 8.00 | 8.00 | 10.00 |
| Zonyl FSE | Wetting Agent | 1.25 | 1.00 | 1.25 |
| TBEP | Plasticizer/ Leveling Aid | 2.20 | 0.50 | 0.30 |
| Example 1 | Epoxy-functional Polymer | 50.88 | 0.00 | 0.00 |
| Example 6 | Epoxy-reactive Polymer | 0.00 | 58.00 | 0.00 |
| Example 7 | Epoxy-reactive Polymer | 0.00 | 0.00 | 49.58 |

Except for the epoxy-functional polymer of Example 1, the identity of the various ingredients presented in Table XXI, immediately above, is as discussed further above in connection with Tables XVII and XVIII.

The dispersions of Examples "D" through "F" were prepared in the manner of Examples "A" through "C", described above.

Films prepared from the dispersions of Examples 8 through 16 and Examples "A" through "F" were subjected to solvent-swelling tests and the results are summarized in Table XXII, which is presented hereinbelow.

Film Preparation Procedure

Films prepared from the dispersions of Examples 8 through 16 and Examples "A" through "F", as presented in Table XXII below, were each produced as follows. A 10 gram sample of dispersion was placed onto an aluminum pan liner-. (Sargent-Welch Scientific Company; catalog No. S 3326) and spread evenly. The wet film was then air dried at a temperature of 70° F. for 48 hours. The substrate-cast film was then removed from the substrate and allowed to further air-dry at room temperature for that number of days indicated in Table XXII, below.

Solvent-Swelling Test Procedures

After removing such film from its substrate, following the passage of that number of days indicated in Table XXII, a film test specimen, measuring 2 centimeters by 1 centimeter, was prepared from the as-cast film. Each such film specimen was then placed into its own 4-oz. jar containing about 50 milliliters of acetone. Each such jar was thereafter capped, and the thus-immersed film specimen observed. Films thusproduced from the dispersions of Examples 8–16 were in general observed to swell and reach maximum size in less than 1 hour. The maximum observed percent increase in area, of each such film specimen, was then recorded. The films produced from the dispersions of Examples 8 through 16 did not dissolve even after several weeks in contact with the acetone. The films produced from the dispersions of Examples "A" and "C" through "F", in contradistinction, were observed to dissolve, generally in less than 30 minutes. The dispersion of Example "B" did not dissolve, after 4 weeks in contact with the acetone.

TABLE XXII

| | Solvent-Swelling of Films | | | |
|---|---|---|---|---|
| Films Produced From the Dispersions of: | Number Of Days That Film Was Allowed To Cure At Room Temperature | | | |
| | 2 | 10 | 22 | 30 |
| Example 8 | 99 | 75 | 75 | 75 |
| Example 9 | 69 | 56 | 56 | 55 |
| Example 10 | 118 | 79 | 78 | 78 |
| Example 11 | 89 | 60 | 60 | 60 |
| Example 12 | 79 | 56 | 56 | 56 |
| Example 13 | 23 | 19 | 18 | 18 |
| Example 14 | 21 | 19 | 19 | 19 |
| Example 15 | 170 | 156 | 150 | 150 |
| Example 16 | 550 | 510 | 480 | 450 |
| Example "A" | Dis. | Dis. | Dis. | Dis. |
| Example "B" | 310 | 220 | 220 | 220 |
| Example "C" | Dis. | Dis. | Dis. | Dis. |
| Example "D" | Dis. | Dis. | Dis. | Dis. |
| Example "E" | Dis. | Dis. | Dis. | Dis. |
| Example "F" | Dis. | Dis. | Dis. | Dis. |

The solvent-swelling data presented in Table XXII, above, represents the percent increase in the area of a film, upon being immersed at room temperature in a solvent, acetone, for a period of 1 hour or less, each such film having been cured at room temperature for that number of days indicated in Table XXII. In Table XXII, the abbreviation "Dis." means that the film dissolved.

Neither did the films produced from the dispersions of Examples 8 through 16 dissolve when ethylene glycol monobutyl ether ("Butyl Cellosolve") was substituted as acetone for solvent; nor did these films dissolve when either acetone or Butyl Cellosolve was subjected to agitation, at a solvent temperature of about 25° C.

Films produced from the dispersions of Examples 8 through 16, upon being immersed in Butyl Cellosolve, were observed to swell and reach maximum size in less than 1 hour, which was similar to our observation when employing acetone as solvent. Yet the films produced from the dispersions of Examples 8 through 16 did not dissolve even after several weeks in contact with Butyl Cellosolve, at a temperature of about 25° C. The films produced from the dispersions of Examples "A" and "C" through "F", on the other hand, upon being immersed in Butyl Cellosolve, were all observed to dissolve, usually in less than 30 minutes.

A comparison of films immersed in acetone and Butyl Cellosolve was performed as follows.

Films were produced from the dispersions of Examples 8 through 12 and 14 through 16 and Examples "A" through "C", "E" and "F" All such films were allowed to cure at room temperature for 10 days. Film test specimens were prepared in the manner described above. Thereafter, the film test specimens were immersed either in acetone or in Butyl Cellosolve, and the maximum percent increase in area was then recorded. The maximum increase in area results are presented in Table XXIII, below.

TABLE XXIII

| | Film Swelling in Acetone and Butyl Cellosolve | |
|---|---|---|
| | % Area Increase of 10-Day Cured Film | |
| Dispersion | Immersed in Acetone | Immersed in Butyl Cellosolve |
| Example 8 | 75 | 73 |
| Example 9 | 56 | 40 |
| Example 10 | 79 | 73 |
| Example 11 | 60 | 80 |
| Example 12 | 56 | 55 |

TABLE XXIII-continued

Film Swelling in Acetone and Butyl Cellosolve

| | % Area Increase of 10-Day Cured Film | |
|---|---|---|
| Dispersion | Immersed in Acetone | Immersed in Butyl Cellosolve |
| Example 14 | 19 | 45 |
| Example 15 | 156 | 195 |
| Example 16 | 510 | 290 |
| Example "A" | Dis. | Dis. |
| Example "B" | 220 | 200 |
| Example "C" | Dis. | Dis. |
| Example "E" | Dis. | Dis. |
| Example "F" | Dis. | Dis. |

Comparison of Physical Properties

Selected physical properties of freshly-prepared dispersions of our invention were compared to like physical properties of those dispersions of our invention, which had been prepared beforehand and which were thereafter subjected to storage (or "aging") at room temperature.

TABLE XXIV

Comparison of Physical Properties of Various Dispersions

| | Freshly-Prepared Dispersion | | Aged Dispersion | | |
|---|---|---|---|---|---|
| Dispersions of | cps. | pH | cps. | pH | Aged For |
| Example 8 | 10.0 | 7.0 | 9.8 | 6.9 | 1 yr., 5 mos. |
| Example 9 | 11.5 | 7.2 | 11.3 | 7.3 | 9 mos. |
| Example 10 | 11.7 | 7.2 | 11.5 | 7.3 | 9 mos. |
| Example 11 | 12.8 | 7.1 | 12.8 | 7.3 | 9 mos. |
| Example 13 | 8.3 | 7.1 | 8.5 | 7.4 | 2 yrs., 4 mos. |
| Example 14 | 8.0 | 7.0 | 8.2 | 7.3 | 2 yrs., 4 mos. |
| Example 15 | 8.3 | 7.1 | 8.5 | 7.2 | 3 mos. |
| Example 16 | 7.5 | 5.3 | 7.5 | 5.1 | 2 mos. |

The data presented in Table XXIV, above, clearly shows, for example, that the viscosity, measured in centipoises ("cps."), as well as the pH of freshly-prepared dispersions produced in accordance with procedures set forth in connection with Examples 13 and 14, above, each remained virtually unchanged after being subjected to storage at room temperature for a time period of about 2 years ("yrs.") and 4 months ("mos.").

Film Properties of Aged Dispersions

With respect to the "aged" dispersions of Table XXIV, above, films were prepared in accordance with the procedures set forth hereinabove. Such films were thereafter subjected to immersion in acetone solvent, in accordance with the solvent-swelling test procedures also set forth hereinabove, to determine the percentage of swelling of each such film. Our observations are recorded in Table XXV, below.

TABLE XXV

Solvent-Swelling of Films Prepared From Aged Dispersions

| Dispersions of | Age of Dispersion | Solvent Swelling |
|---|---|---|
| Example 8 | 1 yr., 5 mos. | 75 |
| Example 9 | 9 mos. | 55 |
| Example 10 | 9 mos. | 82 |
| Example 11 | 9 mos. | 60 |
| Example 13 | 2 yrs., 4 mos. | 18 |
| Example 14 | 2 yrs., 4 mos. | 22 |
| Example 15 | 3 mos. | 150 |
| Example 16 | 2 mos. | 520 |

The solvent-swelling data presented in Table XXV, above, represents the percent increase in the area of a film, upon being immersed at 25° C. in acetone for a period of 1 hour or less, each such film having been cured for 10 days at room temperature.

Although Examples 15 and 16 formed crosslinked films at room temperature, as data in Table XXII indicate, we also did the following experiment. Films from the evaporable dispersions of Examples 15 and 16 were cast in a fashion similar to what was described above and after air drying at room temperature for about 30 minutes were placed in an oven (pre-set at 250° F.) for 5 minutes. The thus-cured films were removed from the substrate; and the solvent swelling test was performed with acetone, as described above. A film cast from the dispersion of Example 15 was found to have an increase in area, due to solvent swelling, of about 150 percent; while Example 16 was found to have an increase in area, due to solvent swelling, of about 480 percent. These values when compared with data for Examples 15 and 16 in Table XXII suggest that crosslinking was significantly accelerated (sped-up) at increased temperature, with crosslinking at 250° F. for 5 minutes approximating 10 days of film cure at room temperature.

ABRASION RESISTANCE

Coating compositions prepared from the disperions of Examples 8 through 14 and Examples "B" and "C" were also subjected to abrasion-resistance testing; and the results of such testing are presented in Table XXVI, below.

TABLE XXVI

Abrasion Resistance of Coating Compositions

| Prepared From Dispersions of | Weight Loss, In Milligrams, Per 100 Cycles |
|---|---|
| Example 8 | 1.35 |
| Example 9 | 1.95 |
| Example 10 | 1.65 |
| Example 11 | 1.69 |
| Example 12 | 2.05 |
| Example 13 | 2.00 |
| Example 14 | 2.00 |
| Example "B" | 2.35 |
| Example "C" | 3.20 |

Abrasion Resistance Test Procedure

A "Tabor" brand abrasion-testing device was utilized to determine the abrasion-resistance values of those coating compositions which had been prepared from the dispersions of Examples 8 through 14 and Examples "B" and "C". The abrasion-testing device thus utilized was a Tabor Model 505 Dual Abrasion Tester equipped with CS-10 calibase wheels. (The abrasion-testing device was obtained from Wm. B. Tabor Co., Inc., of Louisville, Ky.)

Nine (9) different sets of two (2) groups of Tabor abrasion panels (so-called "S-16" specimen plates) were obtained, for purposes of twice performing the AbrasionResistance Test. For each such Abrasion-Resistance Test, each of the nine (9) panels was coated with a different respective one of the nine dispersions presented in Table XXVI, above. Thereafter, each of the panel-applied coatings was allowed to cure at 70° C. for 10 days prior to testing.

The procedures of ASTM D-1044-85 were then employed, for purposes of estimating the resistance of the cured film to one kind of surface abrasion by measurement of certain optical effects.

In particular, with 250-gram weights applied to the wheels of the abrasion-testing device, the thus-coated panels were then abraded for 500 cycles. The weight loss, in milligrams per loo cycles, based upon initial weight of the coated panel, was then noted, and is presented in Table XXVI, above. The results, for each respective coating composition, is based on the average of the test panels thus replicated.

Comparison to Compositions Disclosed in U.S. Pat. No. 4,748,167 to Das et al.

U.S. Pat. No. 4,748,167 to Das et al. discloses certain coating compositions that are said to cure at ambient temperature. More particularly, Das et al. disclose compositions that comprise (I) an epoxy-containing vinyl polymer and (2) an oxygen-containing amine having at least two reactive amino hydrogens per molecule.

For purposes of distinguishing our invention from what is disclosed in U.S. Pat. No, 4,748,167 to Das et al., certain Das Examples were reproduced as follows.

Certain coating compositions disclosed in Example II, Part 2, of the '167 Das patent were prepared in accordance with the procedures of the Das patent and are presented in Table XXVII, below.

TABLE XXVII

Comparative Examples From U.S. Pat. No. 4,748,167

| Coating Composition Ingredients | Parts by Weight (Grams) | | |
|---|---|---|---|
| | A | E | H |
| Jeffamine D-230 | 15 | 15 | 20 |
| Plasticizer | 2 | 10 | 10 |
| De-ionized Water | 15 | 15 | 20 |
| Acrylic Latex | 60 | 60 | 60 |

The "Jeffamine D-230" ingredient, presented in Table XXVII above, is a commercially-available formulation which includes an oxygen-containing amine having at least two reactive amino hydrogens per molecule. "Jeffamine D-230" can be purchased from the Texaco Chemical Company of Houston, Texas. "Jeffamine D-230" is, more particularly, a difunctional primary polyoxypropyleneamine with an average molecular weight of 230.

The "plasticizer" ingredient, presented in Table XXVII above, is a plasticizer blend that comprises 50 parts by weight (in grams) of "Texanol" brand intermediate, 10 parts by weight (in grams) of "Igepal C0897" brand surfactant, and 40 parts by weight (in grams) of de-ionized water. "Texanol" is known by those skilled in the art as being a trade mark for 2,2,4-trimethyl-1,3-pentanediolmonoisobutyrate, a known intermediate for the manufacture of plasticizers, surfactants, urethanes, and pesticides. (See, e.g., page 687 of the "Handbook of Chemical Synonyms and Trade Names", 8th edition, published 1978 by the CRC Press, Inc., of Boca Raton, Fla.) =lqepal C0897" brand surfactant is, more particularly, a nonylphenol polyethylene oxide that is available from the GAF Company of Wayne, N.J.

The "Acrylic Latex" ingredient, presented in Table XXVII above, is that latex which was produced in accordance with the procedures set forth in Part I of Example II of U.S. Pat. No. 4,748,167 to Das et al.

Das composition "A" is hereinafter referred to as our Comparative Example "G".

Das composition "E" is hereinafter referred to as our Comparative Example "H".

Das composition "H" is hereinafter referred to as our Comparative Example "I".

As was mentioned above, all "lettered" examples are outside of the scope of our present invention.

Coatings were produced, on "Linetta" panels, utilizing the coating compositions of Examples "G" through "I" ("Linetta" panels, commercially available from the Linetta Company, are polypropylene-coated paper substrates.) Such substrate-applied coatings were then subjected to specified chemical-resistance spot tests; and the results of such testing are presented in Tables XXX and XXXI, below.

Comparison to Compositions Prepared From Oxygen-Containing Amines

Crosslinkable coating compositions similar in compositional make-up to the crosslinkable coating compositions of Examples 12-16 (presented in Table XVIII, above) were prepared, except that either "Jeffamine D-230" or "Jeffamine D-400" was utilized as the epoxy-reactive polymer in place of those epoxy-reactive polymers which we disclose herein.

"Jeffamine D-400", also commercially available from the Texaco Chemical Co., is more particularly characterized as a difunctional primary polyoxypropyleneamine with an average molecular weight of 400.

The "Jeffamine D-230" and the "Jeffamine D-400" ingredients are thus each generally characterized as oxygencontaining amines having at least two reactive amino hydrogens per molecule.

One coating composition was prepared from the "Jeffamine D-230" brand epoxy-reactive polymer and two coating compositions were prepared from the "Jeffamine D-400" brand epoxy-reactive polymer. These three coating compositions are presented as Comparative Examples "J" through "L" in Table XXVIII, below.

TABLE XXVIII

Compositions Prepared From Oxygen-Containing Amines

| Ingredients | Function | Parts | | |
|---|---|---|---|---|
| | | Ex. "J" | Ex. "K" | Ex. "L" |
| Water | Continuous Phase | 37.35 | 51.72 | 51.72 |
| DEGMEE | Coalescing Agent | 4.00 | 4.00 | 4.00 |
| DPGMME | Coalescing Agent | 4.00 | 4.00 | 4.00 |
| Example 3 | Epoxy-functional Polymer | 50.28 | 28.78 | 28.78 |
| Jeffamine D-400 | Epoxy-reactive Polymer | 2.40 | 9.50 | 0.00 |
| Jeffamine D-230 | Epoxy-reactive Polymer | 0.00 | 0.00 | 9.50 |
| Zonyl FSE | Wetting Agent | 1.00 | 1.00 | 1.00 |
| TBEP | Plasticizer/ Leveling Aid | 1.00 | 1.00 | 1.00 |

The compositions of Comparative Examples "J" through "L" were prepared by adding the ingredients in the order listed (i.e., beginning with the above-listed coalescing agent and ending with the above-listed plasticizer), with good agitation, to tap water, at room temperature. Finally, after the last ingredient was added, the agitation was continued for an additional 30 minutes. The milky-white dispersions were filtered through cheese cloth.

Selected physical properties of the freshly-prepared compositions of Comparative Examples "J" through "L" are set forth in Table XXIX, below.

TABLE XXIX

Selected Physical Properties of the Compositions of Examples "J" Through "L"

| Composition of | pH | cps. | Ratio |
|---|---|---|---|
| Example "J" | 9.9 | 8.2 | 87:13 |
| Example "K" | 10.5 | 8.0 | 50:50 |
| Example "L" | 10.5 | 8.2 | 50:50 |

In Table XXIX, above, the viscosity of the compositions of Examples "J" through "L" was measured in units of centipoises ("cps."). The ratio indicated is the weight of epoxy-function polymer to the weight of epoxy-reactive polymer, in the composition, on a total weight-of-solids basis.

Coatings were produced, on "Linetta" panels, utilizing the coating compositions of Examples "J" through "L" Such substrate-applied coatings were then subjected to specified chemical-resistance spot tests; and the results of such testing are presented in Tables XXX and XXXI, below.

Spot-Resistance Comparison of Various Compositions

The spot-resistance of the various coatings produced from the compositions of Comparative Examples "G" through "I" and Comparative Examples "J" through "L" were compared to the spot-resistance of coatings produced from the dispersions of Examples 11 and 13; and such comparative data are presented in Tables XXX and XXXI, below.

Briefly, each such coating composition was individually applied to its own so-called "Linetta" scrub panel, utilizing a No. 8 drawdown RDS bar, to produce a substrate-applied film that dried to a thickness of about 5 microns. A "Linetta" scrub panel is more particularly characterized as a polypropylene-coated paper substrate. The No. 8 drawdown RDS bar was obtained from the Paul N. Gardner Company of Lauderdale-By-The-Sea, Fla.

Dry films of such a thickness were obtained by following two different drying procedures.

One such drying procedure included placing each such composition-applied substrate into an oven, preset to a temperature of 140° F., for a time period of 1 minute to "initially cure" each such composition, and thereafter removing each such thus initially-cured composition from the oven and allowing each such composition to further cure by air-drying for 4 hours at room temperature. The spotresistance properties of various films prepared in this manner are presented in Table XXX, below.

The other such drying procedure included allowing each such composition-applied substrate to air-dry at room temperature for one week. The spot-resistance properties of various films prepared in this manner are presented in Table XXXI, below.

The spot-resistance properties of each such film were compared as follows. In particular, each such film was tested for spot-resistance against tap water, against a five (5) weight percent solution of sodium hydroxide ("NaOH"), against "409" brand cleaner, and against an ethanol-water mixture. The "409" cleaner was obtained from The Clorox Company of Oakland, Calif. The ethanol-water mixture consisted of 50 weight percent ethanol ("EtOH") and 50 weight percent water ("$H_2O$").

Spot-Forming Procedure

About 0.05 milliliters of each above-mentioned spotting composition was applied to each such film, to form three (3) "spots" thereon. The three "spots" were then allowed to contact the film for 1 minute, for 5 minutes, and for 30 minutes, respectively, and were each thereafter individually blotted off. Thereafter, the thus-blotted effects of each of the above-mentioned spotting compositions was ascertained visually, and such observations are collectively recorded in Tables XXX and XXXI, below.

TABLE XXX

Spot-Resistance Properties of Films Formed by Drying For 1 Min. at 140° F., Followed by Air-Drying for 4 Hours at Room Temperature

| Compositions | Contact Time | Water | 5% NaOH | "409" | EtOH/$H_2O$ |
|---|---|---|---|---|---|
| Example "G" | 1 min. | Fair | Fair | Good | Poor |
| Example "G" | 5 min. | Poor | Poor | Fair | Poor |
| Example "G" | 30 min. | Poor | Poor | Fair | Poor |
| Example "H" | 1 min. | Fair | Fair | Good | Poor |
| Example "H" | 5 min. | Fair | Poor | Fair | Poor |
| Example "H" | 30 min. | Poor | Poor | Poor | Poor |
| Example "I" | 1 min. | Fair | Fair | Good | Poor |
| Example "I" | 5 min. | Fair | Poor | Fair | Poor |
| Example "I" | 30 min. | Poor | Poor | Poor | Poor |
| Example "J" | 1 min. | Good | Good | Good | Good |
| Example "J" | 5 min. | Fair | Poor | Poor | Fair |
| Example "J" | 30 min. | Fair | Poor | Poor | Fair |
| Example "K" | 1 min. | Good | Good | Good | Good |
| Example "K" | 5 min. | Fair | Poor | Poor | Fair |
| Example "K" | 30 min. | Fair | Poor | Poor | Fair |
| Example "L" | 1 min. | Fair | Fair | Fair | Fair |
| Example "L" | 5 min. | Poor | Poor | Poor | Poor |
| Example "L" | 30 min. | Poor | Poor | Poor | Poor |
| Example 11 | 1 min. | Exc. | Exc. | Exc. | V. Good |
| Example 11 | 5 min. | Exc. | Exc. | Exc. | Good |
| Example 11 | 30 min. | Exc. | V. Good | Exc. | Good |
| Example 13 | 1 min. | Exc. | Exc. | Exc. | Good |
| Example 13 | 5 min. | Exc. | Exc. | Exc. | Good |
| Example 13 | 30 min. | V. Good | Good | Good | Good |

TABLE XXXI

Spot-Resistance Properties of Films Formed by Air-Drying at Room Temperature for 1 Week

| Compositions | Contact Time | Water | 5% NaOH | "409" | EtOH/$H_2O$ |
|---|---|---|---|---|---|
| Example "G" | 1 min. | Fair | Poor | Fair | Poor |
| Example "G" | 5 min. | Poor | Poor | Poor | Poor |
| Example "G" | 30 min. | Poor | Poor* | Poor* | Poor |
| Example "H" | 1 min. | Fair | Poor | Fair | Poor |
| Example "H" | 5 min. | Fair | Poor | Poor | Poor |
| Example "H" | 30 min. | Poor | Poor | Poor | Poor |
| Example "I" | 1 min. | Fair | Fair | Fair | Poor |
| Example "I" | 5 min. | Poor | Poor | Fair | Poor |
| Example "I" | 30 min. | Poor | Poor | Poor | Poor |
| Example "J" | 1 min. | Good | Fair | Fair | Fair |
| Example "J" | 5 min. | Fair | Poor | Fair | Poor |
| Example "J" | 30 min. | Poor | Poor* | Poor | Poor* |
| Example "K" | 1 min. | Fair | Fair | Fair | Fair |
| Example "K" | 5 min. | Fair | Poor | Fair | Poor |
| Example "K" | 30 min. | Fair | Poor* | Poor | Poor* |
| Example "L" | 1 min. | Fair | Fair | Fair | Fair |
| Example "L" | 5 min. | Poor | Poor | Poor | Poor |
| Example "L" | 30 min. | Poor | Poor* | Poor | Poor* |
| Example 11 | 1 min. | Exc. | Exc. | Exc. | Exc. |
| Example 11 | 5 min. | Exc. | Exc. | Exc. | Good |

TABLE XXXI-continued

Spot-Resistance Properties of Films Formed by Air-Drying at Room Temperature for 1 Week

| Compositions | Contact Time | Spotting Compositions | | | |
|---|---|---|---|---|---|
| | | Water | 5% NaOH | "409" | EtOH/H$_2$O |
| Example 11 | 30 min. | Exc. | V. Good | Exc. | Good |
| Example 13 | 1 min. | Exc. | Exc. | Exc. | V. Good |
| Example 13 | 5 min. | Exc. | Exc. | Exc. | V. Good |
| Example 13 | 30 min. | Exc. | Good | Good | V. Good |

*Film Damage

In Tables XXX and XXXI, above, the entry "Poor" means whitening and dulling (loss of gloss) of film; the entry "Fair" means slight whitening and dulling of film (loss of gloss); the entry "Good" means no whitening but some dulling of film (loss of gloss); the entry "V.Good" means no whitening but slight dulling of film; and the entry "Exc." means that the film generally appeared unaffected in that there was no dulling and no other noticeable change in the appearance of the film.

As was mentioned above, all "lettered" examples are beyond the scope of this invention. Thus, Examples "G" through "L", discussed above, were prepared for purposes of distinguishing certain aspects and features of our present invention.

A crosslinkable surface coating produced from a novel dispersion that exhibits shelf-storage stability of 1-year or more has been described hereinabove. Also described hereinabove are a number of preferred methods for the production of our novel dispersion. While stable dispersions as well as the methods for their production have been described hereinabove with reference to several preferred embodiments, our present invention is not to be limited to these embodiments. On the contrary, a variety of alternative methods of making the stable dispersion of our present invention will become apparent to those skilled in the art upon reading the foregoing description. Accordingly, such alternatives, changes and/or modifications are to be considered as forming a part of our present invention insofar as they fall within the spirit and scope of the appended claims.

We claim:

1. A method of producing an evaporable dispersion which includes evaporable components and which, upon evaporation of the evaporable components, is able to form a crosslinked surface coating on a substrate, the method comprising the steps of:

combining water, a non-ionic emulsifier having an HLB value of about 9 to about 19, a free-radical initiator, and an effective amount of a buffering agent, for producing an evaporable, emulsifier-containing aqueous mixture having a pH which ranges from of about 3 to about 9;

adding to the evaporable, emulsifier-containing aqueous mixture, at predetermined reaction conditions and while maintaining the pH range, an effective amount of an emulsion-polymerizable monomeric mixture, for producing an evaporable, first oil-in-water emulsion which contains polymeric particles having epoxy-functional pendant groups and possessing a glasstransition temperature of about 10 degrees Celsius to about 120 degrees Celsius, the emulsion-polymerizable monomeric mixture comprising relative effective amounts of (1) an emulsion-polymerizable monomer having epoxy-functional pendant groups and (2) an emulsion-polymerizable ethylenically-unsaturated monomer selected from the group consisting of a mono vinylidene aromatic monomer, an alpha beta ethylenically-unsaturated carboxylic acid monomer, an alpha beta ethylenically-unsaturated carboxylic acid ester monomer and its monomeric derivatives, a vinyl ester monomer and its monomeric derivatives, and combinations thereof, wherein the relative amounts of the emulsion-polymerizable monomer having epoxy-functional pendant groups and the emulsion-polymerizable ethylenically-unsaturated monomer, in the emulsifier-containing aqueous mixture, are effective for producing the above-recited first oil-in-water emulsion which contains polymeric particles having epoxy-functional groups and possessing a glass-transition temperature of about 10 degrees Celsius to about 120 degrees Celsius; and introducing into the evaporable, first oil-in-water emulsion an effective amount of a second oil-in-water emulsion containing a polymer having epoxy-reactive pendant moieties, for producing the evaporable dispersion, the epoxy-reactive pendant moieties being selected from the group consisting of amine moieties, amide moieties, carboxylic acid moieties, and combinations thereof, the relative amounts of (1) polymeric particles having epoxy-functional pendant groups and (2) polymer having epoxy-reactive pendant moieties, in the evaporable dispersion, being effective, upon evaporation of the volatile components of the dispersion, to enable crosslinking to take place between the epoxy-functional groups and the epoxy-reactive moieties at room temperature, wherein the amount of non-ionic emulsifier in the evaporable dispersion is effective for maintaining the epoxy-reactive moieties and the epoxy-functional groups in spaced-apart relationship in the evaporable dispersion, whereupon the thusproduced evaporable dispersion exhibits shelf-storage stability of at least one year at room temperature.

2. The evaporable dispersion produced in accordance with the method of claim 1.

3. A container which contains the evaporable dispersion of claim 2.

4. The method of claim 1 further including the step of applying the evaporable dispersion as a coating onto the surface of a substrate, in an evaporative environment, whereby the evaporable components of the dispersion evaporate, which results in the formation of a crosslinked surface coating on the substrate.

5. The crosslinked surface coating produced in accordance with the method of claim 4.

6. A substrate onto which the crosslinked surface coating of claim 5 has been applied.

7. The method of claim 1 further including the steps of applying the evaporable dispersion as a coating onto the surface of a substrate, and air-drying the substrate-applied coating at room temperature for an amount of time that is effective for causing the evaporable components of the dispersion to evaporate, thereby resulting in the formation of a crosslinked surface coating on the substrate.

8. The crosslinked surface coating produced in accordance with the method of claim 7.

9. A substrate onto which the crosslinked surface coating of claim 8 has been applied.

10. The method of claim 1 further including the steps of applying the evaporable dispersion as a coating onto the surface of a substrate, and drying the substrate-applied coating at an elevated temperature for an amount of time that is effective for causing the evaporable components of the dispersion to evaporate, thereby resulting in the formation of a crosslinked surface coating on the substrate.

11. The crosslinked surface coating produced in accordance with the method of claim 10.

12. A substrate onto which the crosslinked surface coating of claim 11 has been applied.

13. An evaporable dispersion which includes evaporable components, the dispersion comprising:
 a first oil-in-water emulsion comprising polymeric particles having epoxy-functional pendant groups and possessing a glass-transition temperature of about 10 degrees Celsius to about 120 degrees Celsius, a non-ionic emulsifier having an HLB value of about 9 to about 19, and an effective amount of a buffering agent so that the first oil-in-water emulsion has a pH of about 3 to about 9; and
 a second oil-in-water emulsion comprising a polymer having epoxy-reactive pendant moieties selected from the group consisting of amine moieties, amide moieties, carboxylic acid moieties, and combinations thereof,
wherein the dispersion is characterized as including (1) polymeric particles having pendant epoxy-functional groups and (2) a polymer having pendant epoxy-reactive moieties,
wherein the amount of non-ionic emulsifier in the dispersion is effective for maintaining the epoxy-reactive moieties and the epoxy-functional groups in spaced-apart relationship in the dispersion, and
wherein the dispersion is further characterized as exhibiting shelf-storage stability of at least one year at room temperature.

14. A contianer which contains the evaporable dispersion of claim 13.

* * * * *